United States Patent [19]

Gary

[11] Patent Number: 5,693,302
[45] Date of Patent: Dec. 2, 1997

[54] PROCESS FOR THE REMOVAL OF AN IMPURITY CONTAINED IN A COMPOSITE GAS

[75] Inventor: Daniel Gary, Versailles, France

[73] Assignee: L'Air Liquide, Societe Anonyme Pour L'Etude et L'Exploitation des Procedes Georges Claude, Paris Cedex, France

[21] Appl. No.: 590,514

[22] Filed: Jan. 24, 1996

[30] Foreign Application Priority Data

Jan. 25, 1995 [FR] France ..................... 95 00832

[51] Int. Cl.$^6$ ..................................... C01B 31/18
[52] U.S. Cl. ..................... 423/247; 423/248; 423/351
[58] Field of Search ........................... 423/351, 247, 423/248

[56] References Cited

U.S. PATENT DOCUMENTS

| | | |
|---|---|---|
| 4,136,062 | 1/1979 | Boudart et al. |
| 5,238,670 | 8/1993 | Louise et al. ............... 423/351 |

FOREIGN PATENT DOCUMENTS

| | | |
|---|---|---|
| 0 222 497 | 5/1987 | European Pat. Off. |
| 0 395 856 | 11/1990 | European Pat. Off. |
| 0 454 531 | 10/1991 | European Pat. Off. |
| 2 690 357 | 10/1993 | France |

OTHER PUBLICATIONS

Y. Chen et al., "Catalyst for Removal of Hydrogen and Oxygen from Inert Gases", *Chemical Abstracts*, vol. 107, No. 20, Nov. 1987, p. 211.

*Primary Examiner*—Deborah Jones
*Assistant Examiner*—Amy M. Harding
*Attorney, Agent, or Firm*—Young & Thompson

[57] ABSTRACT

A process for the substantial removal of at least one of the carbon monoxide and hydrogen impurities contained in a composite gas, according to which:

(a) at least one of the carbon monoxide and hydrogen impurities contained in the composite gas are reacted with oxygen, in contact with a catalyst comprising particles of at least one metal chosen from the group consisting of gold and palladium, these particles being supported by titanium dioxide, in order respectively to form carbon dioxide and water;

(b) optionally, the carbon dioxide and the water formed are removed from the composite gas;

(c) the composite gas, substantially free of its carbon monoxide and/or hydrogen impurities, is recovered.

16 Claims, 2 Drawing Sheets

PROCESS FOR THE REMOVAL OF AN IMPURITY CONTAINED IN A COMPOSITE GAS

FIELD OF THE INVENTION

The invention relates to a process for substantial removal of at least one of the impurities carbon monoxide and hydrogen contained in a composite gas, in particular a mixture of nitrogen and/or argon with oxygen, such as air, according to which one of the said impurities is reacted with oxygen in contact with a catalyst.

BACKGROUND OF THE INVENTION

Large quantities of inert gas, in particular argon and, above all, nitrogen, are used, for example, in the pharmaceutical industry and the electronics industry, in particular in the fabrication of semiconductors. Above all in the latter case, these inert gases must be as pure as possible and, in particular, they must be substantially free of impurities such as carbon monoxide and hydrogen, which reduce the quality and the performance of semiconductors. Carbon monoxide and/or hydrogen contents of the order of a few hundreds of ppb (parts per billion by volume) were recently still tolerated.

However, the electronics industry currently requires inert gases, such as nitrogen, of high purity, i.e. containing approximately less than 10 ppb of hydrogen and less than 5 ppb of carbon monoxide.

A process has already been proposed in Patent Application GB-A-2,234,450, for oxidizing compounds with low molecular weight, such as carbon monoxide, hydrogen and hydrocarbons. According to this process, the oxidation is carried out in the presence of a catalyst consisting of at least one precious metal supported by an oxide of a reducing metal chosen from $Fe_2O_3$, $Ce_2O_3$, $ZrO_2$, CaO, $TiO_2$, oxides of rare earths, $MnO_2$, $V_2O_5$ and $Cr_2O_3$.

More particularly, in one of its examples this document describes a process for the conversion of the carbon monoxide contained in air, with the aid of a catalyst comprising platinum supported by titanium dioxide, associated with alpha-alumina.

The Applicant Company has, however, been able to observe that such a catalyst does not permit efficient removal of carbon monoxide and hydrogen.

With a view to preparing high-purity nitrogen, the Applicant Company has, in Patent Application EP-A-0,454,531, described a process according to which the carbon monoxide and/or hydrogen impurities are removed from air by passing this air over a catalyst consisting of particles of at least one metallic element chosen from the group consisting of copper and metals in the platinum series, namely ruthenium, rhodium, palladium, osmium, iridium and platinum, these particles being supported on a support having a high specific surface. The supports may consist of zeolites, silica or alumina. The air treated by passage over the catalyst is most often air compressed using a compressor; at the exit of this compressor, the air has a temperature normally between 80° C. and 120° C. The air thus purified has the water and carbon dioxide which it contains removed, for example by adsorption on a molecular sieve. After this, the air is sent into a distillation column with a view to separating nitrogen from the other constituents of air, essentially oxygen. The Applicant Company has been able to observe that good results could be obtained using this process, in particular when the catalysts include large quantities of particles such as palladium and platinum. However, these precious metals are relatively expensive, which commensurately increases the cost of the overall process for the preparation of high-purity nitrogen.

Furthermore, the Applicant Company has been able to observe that the catalysts described in Patent Application EP-A-0,454,531 had, for efficient removal of carbon monoxide and hydrogen, to be regenerated frequently, for example twice per day, i.e. brought into contact with compressed air whose temperature is raised to approximately 200° C.

Frequent regeneration of the catalyst leads to the use of two catalyst beds in parallel, which operate alternately, one allowing purification of the air while the other is regenerated. As indicated above, the compressed air leaves the compressor at a temperature normally between 80° C. and 120° C. Heating means should therefore be available to heat the air entering into contact with the catalyst to a temperature of 200° C. It is observed that using the catalysts according to Patent Application EP-A-0,454,531 requires equipment which is elaborate, in particular because of the heating means, and expensive in terms of energy.

The Applicant Company has therefore sought a process for substantially removing at least one of the impurities carbon monoxide and hydrogen which obviates the drawbacks mentioned above.

Thus, a first subject of the invention consists of a method for removing one of the said impurities from a composite gas, which can be employed using a catalyst having a low precious metal content.

A second subject of the invention consists of such a process which can be implemented over a long period of time, for example several weeks, or several months or even several years, without it being necessary to regenerate the catalyst or to heat the composite gas to be treated to a temperature of the order of 200° C.

SUMMARY OF THE INVENTION

The present invention relates to a process for the substantial removal of at least one of the carbon monoxide and hydrogen impurities contained in a composite gas, characterized in that:

(a) at least one of the carbon monoxide and hydrogen impurities contained in the composite gas are reacted with oxygen, in contact with a catalyst comprising particles of at least one metal chosen from the group consisting of gold and palladium, these particles being supported by titanium dioxide, in order respectively to form carbon dioxide and water;

(b) optionally, the carbon dioxide and the water formed are removed from the composite gas;

(c) the composite gas, substantially free of its carbon monoxide and/or hydrogen impurities, is recovered.

BRIEF DESCRIPTION OF THE DRAWINGS

The invention is described in more detail below and with reference to FIGS. 1 and 2.

DETAILED DESCRIPTION OF THE INVENTION

Figure 1:
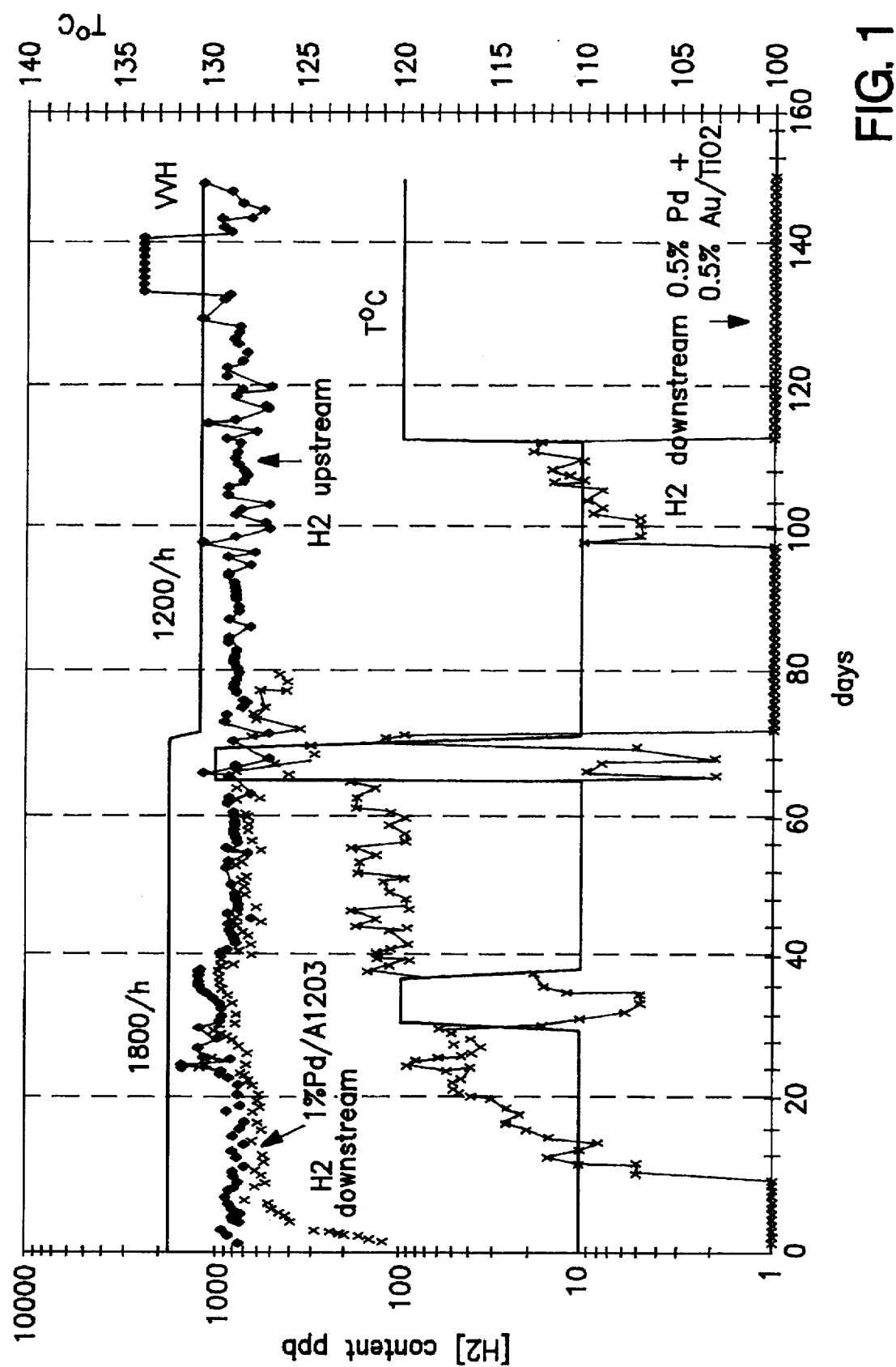
FIG. 1 represents the removal of hydrogen from air, on the one hand according to the process of the invention with the use of a catalyst comprising palladium and gold supported by titanium dioxide and, on the other hand, a process not according to the invention, with the use of a catalyst comprising palladium supported by alumina.

The content by weight of the gold particles supported by the titanium dioxide support is generally between 0.1% and 2.5%, preferably between 0.1% and 0.7%, relative to the total weight of the catalyst. The content by weight of the palladium particles supported by the titanium dioxide support is generally between 0.3 and 2.5%, preferably between 0.3 and 1%, relative to the total weight of the catalyst.

According to an advantageous embodiment of the invention, the catalyst consists of supported gold and palladium particles. In this case, the weight ratio between the gold particles and the palladium particles is generally between 25/75 and 75/25, and it is preferably of the order of 50/50.

The catalyst according to the invention can be coated with a layer of cerium oxide ($CeO_2$), this being in particular with a view to improving the mechanical properties. The weight of this cerium oxide may be between 5 and 15% relative to the total weight of the catalyst.

The support may be in various forms, for example in the form of chips or honeycombs (monolithic structure). It is preferably in the form of balls or rods which can be arranged with ease in a reactor. The support is usually porous and may have a pore volume of less than or equal to 1 $cm^3/g$, preferably between 0.2 and 0.5 $cm^3/g$. The radius of the pores may be less than or equal to 25 nm, and it is preferably between 1 and 15 nm. The specific surface of this titanium dioxide support may be between 10 and 300 $m^2/g$, preferably between 50 and 250 $m^2/g$ and more preferably between 50 and 150 $m^2/g$.

The density of the support may be between 500 and 1000 g/l, preferably between 600 and 900 g/l.

The catalyst used in the process of the invention can be prepared according to known processes of coprecipitation or, preferably, impregnation.

In order to prepare such a catalyst, it is possible to impregnate the support with a solution comprising a gold salt, a palladium salt or a mixture of such salts. The gold salt or the palladium salt may be a halide, in particular a chloride, or, advantageously, a nitrate. After impregnation, the impregnated support is dried, for example by subjecting it for a period of 12 to 48 hours to a temperature of between 500° C. and 150° C. The support is then calcined, preferably at a temperature of between 300° C. and 550° C. The impregnated and dried support may be calcined in air, preferably dry air. After calcining, the metal particles are reduced at elevated temperature, for example by flushing with a reducing gas such as hydrogen or a mixture of hydrogen and an inert gas such as nitrogen.

The process according to the invention can, in particular, be implemented for a composite gas consisting of a mixture of at least one inert gas with oxygen. The inert gas may be nitrogen or argon; the composite gas is preferably air.

Reaction of the carbon monoxide and hydrogen impurities in contact with the catalyst may be carried out with the oxygen optionally contained in the composite gas, in particular when this gas consists of air, or with the oxygen added to the composite gas. The quantity of oxygen thus added should at least correspond to the stoichiometric quantity required to form carbon dioxide and water from the impurities.

Reaction of the impurities and oxygen in contact with the catalyst is usually carried out with a composite gas whose temperature is less than 130° C., more particularly at a temperature of between −40° C. and 130° C., preferably a temperature between 80° and 120° C.

During reaction of the impurities with oxygen in contact with the catalyst, according to the process of the present invention, the composite gas may be subjected to a pressure of between $10^5$ and $3 \times 10^6$ Pa, more generally between $7 \times 10^5$ and $1.5 \times 10^6$ Pa.

The composite gas brought into contact with the catalyst has an actual space-time yield which is a function of the pressure and temperature of the composite gas treated. The actual space-time yield is generally less than 2000 $h^{-1}$, and preferably between 500 and 1800 $h^{-1}$.

The carbon monoxide and hydrogen contents of the composite gas treated according to the process of the invention are usually less than 40 ppm (parts per million by volume), more generally of the order of 1 ppm to 200 ppb, for each of these impurities. The composite gas recovered after implementation of the process according to the invention may include less than 10 ppb of hydrogen and less than 5 ppb of carbon monoxide. These contents are those which usually satisfy the specifications in the electronics industry.

After reaction between the impurities and oxygen, the carbon dioxide and water formed can be removed from the composite gas. This removal can be carried out conventionally by means of an adsorbent such as a molecular sieve or alumina. This removal of water and carbon dioxide is more particularly required when the composite gas is air intended to be subsequently treated by cryogenic distillation with a view to separating nitrogen from the other constituents of air, essentially oxygen and, optionally, argon.

The composite gas recovered, free or substantially free of its carbon monoxide and hydrogen impurities, may, when it consists of a gas mixture, be subsequently treated with a view to separating some or each of the gases which constitute it. Thus, if the composite gas consists of air, the air recovered subsequent to the process according to the invention may be treated so that nitrogen and/or argon is separated from the oxygen in the air. This separation may be carried out conventionally by cryogenic distillation, by selective adsorption (PSA and VSA processes) or by membrane separation.

According to another aspect of the invention, it relates to a process for the preparation of purified nitrogen substantially free from the impurities carbon monoxide and hydrogen, from air, characterized in that:

(a) at least one of the impurities carbon monoxide and hydrogen contained in the air is reacted with the oxygen in this air, in contact with a catalyst comprising particles of at least one metal chosen from the group consisting of gold and palladium, these particles being supported by titanium dioxide, so as respectively to form carbon dioxide and water;

(b) optionally, the carbon dioxide and the water formed are removed from the air;

(c) the nitrogen is separated from the oxygen in the air;

(d) high-purity nitrogen, substantially free from the carbon monoxide and hydrogen impurities, is recovered.

The process for the separation of nitrogen from oxygen in air is preferably a conventional cryogenic distillation process.

The following examples have the purpose of illustrating the present invention:

EXAMPLE 1:

A catalyst according to the invention, comprising titanium dioxide rods supporting 0.5% by weight of gold particles and 0.5% by weight of palladium particles is arranged in a reactor. This catalyst may or may not be coated with a cerium oxide layer.

The titanium dioxide used as support for the catalysts had a density of 915 g/l and a specific surface of 140 m²/g. An air flow compressed to 7 bar was treated in this reactor with a view to removing carbon monoxide and hydrogen impurities from it. The actual space-time yields of the air through the reactor was 1800 h$^{-1}$.

The contents upstream (at the entry of the reactor) and downstream (at the exit of the reactor) of the carbon monoxide and hydrogen impurities contained were measured by means of an RGA3 analyzer marketed by the company Trace Analytical, the detection threshold of which is less than or equal to 5 ppb for hydrogen and less than 3 ppb for carbon monoxide.

The air entering the reactor contained 1000 ppb of hydrogen and 500 ppb of carbon monoxide.

The working life (in hours) of the catalyst, as well as the downstream contents of hydrogen and carbon monoxide in the air recovered at the exit of the reactor are given in Table I below.

The working life corresponds to the period of time for which the downstream contents of hydrogen and carbon monoxide corresponded to the specifications of the electronics industry, i.e. a hydrogen content of less than 10 ppb and a carbon monoxide content of less than 5 ppb. The test is stopped as soon as the downstream contents of the impurities exceed those fixed by the specifications. However, when the test shows a working life rigorously greater than 20 hours, it is intentionally stopped by the experimenter in so far as he considers that the duration of the test has sufficiently demonstrated the effectiveness of the catalyst.

The water content in the upstream air, the carbon monoxide and hydrogen contents in the downstream air, as well as the working life of the catalyst are given in Table I below.

TABLE I

| Tests | Temperature (°C.) | CeO$_2$ | Downstream contents (in ppb) H$_2$ | CO | H$_2$O (g/Nm$^3$) | Duration (h) |
|---|---|---|---|---|---|---|
| 1 | 100 | Y | ND | 3 | 7 | 125 |
| 2 | 110 | Y | ND | 3 | 10 | 50 |
| 3 | 110 | Y | ND | 3 | 7 | 60 |
| 4 | 120 | Y | ND | 3 | 10 | 24 |
| 5 | 100 | N | 10 | 3 | 10 | 20 |
| 6 | 110 | N | ND | 3 | 10 | 150 |

ND = not detected
Y = CeO$_2$ coating
N = absence of CeO$_2$ coating

EXAMPLE 2:

Various catalysts, in accordance or not in accordance with the invention, were successively arranged in a reactor. The catalysts according to the invention consisted of palladium particles or palladium particles and gold particles, supported by titanium dioxide. The catalysts not according to the invention consisted of palladium particles or palladium particles associated with gold particles, supported by alumina.

Air comprising 800 ppb of hydrogen and various water concentrations was treated using these catalysts. The minimum temperature necessary for total removal of hydrogen (i.e. a content at least less than 5 ppb, which is the minimum content detectable by the measuring equipment) was examined.

The results obtained are given in Table II below:

TABLE II

| Tests | Support | Catalyst content (% by weight) Au | Pd | CeO$_2$ | Minimum temperature (°C.) after 2 h of treatment H$_2$O 1 g/ Nm$^3$ | 6 g/Nm$^3$ | 10 g/ Nm$^3$ | Minimum temperature (°C.) after 50 h of treatment H$_2$O 6 g/Nm$^3$ |
|---|---|---|---|---|---|---|---|---|
| 7 | TiO$_2$ | — | 2 | N | 70 | 115 | 120 | 115 |
| 8 | TiO$_2$ | 0.5 | 0.5 | Y | — | 100 | 110 | 110 |
| 9 | TiO$_2$ | 0.5 | 0.5 | N | 70 | 100 | 110 | 100 |
| A | Al$_2$O$_3$ | — | 2 | N | 90 | 130 | — | 150 |
| B | Al$_2$O$_3$ | — | 2 | Y | 100 | 110 | 120 | 130 |
| C | Al$_2$O$_3$ | 0.5 | 0.5 | Y | 100 | 130 | — | 150 |

The Tests 7 to 9 are in accordance with the invention; Tests A to C are not in accordance with the invention.

The tests show that a support based on titanium dioxide makes it possible to purify air in regard to its hydrogen impurity at a temperature lower than that required when the support is alumina. It is also noted that, after a treatment time of 50 hours, the catalysts including a TiO$_2$ support still permit effective removal of hydrogen at temperatures below 120° C. In contrast, under the same conditions, the catalysts comprising a support based on alumina require a temperature greater than or equal to 130° C. for satisfactory removal of hydrogen. In other words, implementation of the process according to the invention makes it possible to treat air directly at the exit of the compressor, without it being necessary to heat this air.

EXAMPLE 3:

Various catalysts in accordance (Tests 10 and 11) or not in accordance (Tests 12 and 13) with the invention were arranged in a reactor. The catalysts according to the invention comprised 0.5% by weight of palladium particles; those not according to the invention comprised 0.5% by weight of platinum particles. All the catalysts comprised a titanium dioxide support with density 915 g/l and specific surface 140 m²/g.

Air comprising:
—900 ppb of hydrogen,
—600 ppb of carbon monoxide,
—8.5 g of water per m³,
was treated with these catalysts.

The space-time yield of the air treated was 1800 h$^{-1}$.
The results obtained are given in Table III below.

TABLE III

| Tests | Supported particles | Air temperature °C. | Downstream contents (ppb) H$_2$ | CO | Duration (h) |
|---|---|---|---|---|---|
| 10 | Pd | 110 | 20 | 3 | >24 |
| 11 | Pd | 130 | ND | 3 | >200 |
| 12 | Pt | 110 | 500 | 8 | 5 |
| 13 | Pt | 130 | 3 | 3 | 70 |

ND = Not determined

EXAMPLE 4:

A catalyst according to the invention, consisting of titanium dioxide rods supporting palladium particles and gold particles was arranged in a reactor identical to that in Example 1. The content by weight of palladium and gold in the catalyst is 0.5% for each of these metals. The density of the titanium dioxide support was 780 g/l and its specific surface was 95 m²/g.

In parallel, a catalyst not according to the invention, consisting of aluminum balls supporting palladium particles, was arranged in a reactor identical to that in Example 1. The palladium concentration in the catalyst is 1% by weight.

The same air flow (divided into two parallel flows) compressed to 7 bar and including approximately 1000 ppb of hydrogen and 10 g/Nm³ of water was treated in each of these reactors. The actual space-time yield at the entry of the reactor was 1800 h⁻¹ for 72 days, after which the space-time yield was reduced to 1200 h⁻¹. The temperature of the air entering each of the reactors was varied over time. The temperature was always between 110° and 130° C.

The results obtained are represented in FIG. 1. They show in particular that a catalyst according to the invention, comprising a support based on titanium dioxide, allows hydrogen-purification of air in accordance with the specifications of the electronics industry, i.e. a hydrogen content in the treated air of less than 10 ppb. When the space-time yield is 1200 h⁻¹, it is possible to recover air whose hydrogen content is less than 10 ppb over a long period of time.

Such results could not be obtained with a catalyst not according to the invention, the support of which is based on alumina. The air, with its hydrogen impurity removed, can then be treated by passage in contact with an alumina with a view to removing the water formed as well as the water and carbon dioxide originally contained in the air treated. After this, the air thus purified can be distilled by cryogenic distillation, in conventional fashion, with a view to obtaining nitrogen in which the hydrogen contents are identical or substantially identical to those present in air treated according to the process according to the invention described above.

EXAMPLE 5:

In a device identical to that in Example 3, comprising two reactors, a catalyst based on alumina, identical to that in Example 3, was arranged in the first reactor. A catalyst according to the invention, comprising 1% of palladium supported by titanium dioxide, was arranged in the second reactor. This support had the same characteristics as that employed in Example 3. The air treated in each of these reactors has the same characteristics as that treated in Example 3. Here again, for 72 days, the actual space-time yield of the air at the entry of the reactor was 1800 h⁻¹, after which the space-time yield was reduced to 1200 h⁻¹.

Figure 2:
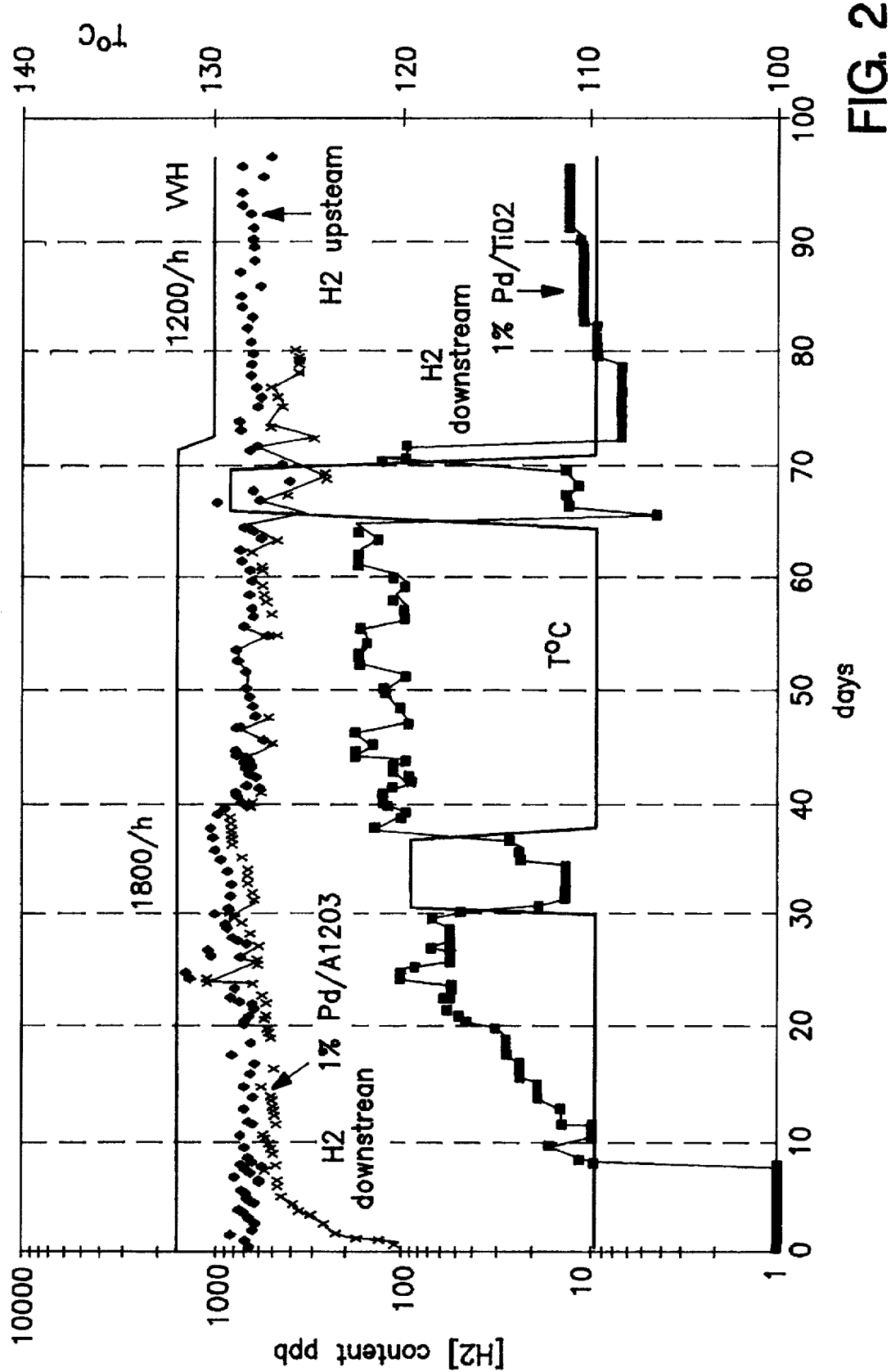
FIG. 2 represents the removal of hydrogen from air, on the one hand according to the process of the invention with the use of a catalyst comprising palladium supported by titanium dioxide and, on the other hand, a process not according to the invention, implemented with a catalyst comprising palladium supported by alumina.

The results obtained are represented in FIG. 2. They show that the hydrogen content in the air treated according to the process of the invention remains in accordance with the specifications of the electronics industry, at an air temperature of 110° C., over a period of approximately 9 days. When the actual space-time yield of the air is reduced to 1200 h⁻¹, a catalyst according to the present invention makes it possible to keep the hydrogen content in the air treated at a content of less than or very slightly greater than that required by the specifications of the electronics industry (i.e. a content of less than 10 ppb), this being for a long period of time.

In contrast, a catalyst not according to the invention, comprising a support based on alumina, does not make it possible to obtain air in which the hydrogen content is in accordance with the specifications of the electronics industry.

The air, with its hydrogen impurity removed, can then be treated by passage in contact with an alumina with a view to removing the water formed as well as the water and carbon dioxide originally contained in the air treated. After this, the air thus purified can be distilled by cryogenic distillation, in conventional fashion, with a view to obtaining nitrogen in which the hydrogen contents are identical or substantially identical to those present in the air treated according to the process according to the invention described above.

I claim:

1. Process for the substantial removal of carbon monoxide and/or hydrogen impurities contained in a composite gas, said process comprising:
   a) contacting the composite gas with oxygen and a catalyst comprising particles selected from the group consisting of gold, palladium, and mixtures thereof; said particles being supported by titanium dioxide, wherein the carbon monoxide and/or hydrogen impurities react with oxygen to form carbon dioxide and/or water respectively;
   b) optionally removing the carbon dioxide and the water from the composite gas; and
   c) recovering a composite gas substantially free of carbon monoxide and/or hydrogen impurities.

2. Process according to claim 1, wherein the catalyst comprises supported gold and palladium particles.

3. Process according to claim 2, wherein the weight ratio between the gold particles and the palladium particles is between 75/25 and 25/75.

4. Process according to claim 3, wherein the weight ratio between the gold particles and the palladium particles is about 50/50.

5. Process according to claim 1, wherein the catalyst comprises particles of gold, and the weight content of the gold particles is between 0.1% and 2.5% relative to the total weight of the catalyst.

6. Process according to claim 5, wherein the weight content of the gold particles is between 0.1% and 0.7% relative to the total weight of the catalyst.

7. Process according to claim 1, wherein the catalyst comprises particles of palladium, and the weight content of the palladium particles is between 0.3% and 2.5% relative to the total weight of the catalyst.

8. Process according to claim 7, wherein the weight content of the palladium particles is between 0.3% and 1% relative to the total weight of the catalyst.

9. Process according to claim 1, wherein the composite gas is a mixture of at least one inert gas and oxygen.

10. Process according to claim 1, wherein the composite gas is air.

11. Process according to claim 1, wherein the composite gas in contact with the catalyst is subjected to a pressure ranging between $10^5$ and $3 \times 10^6$ Pa.

12. Process according to claim 11, wherein the composite gas in contact with the catalyst is subjected to a pressure ranging between $7 \times 10^5$ and $1.5 \times 10^6$ Pa.

13. Process according to claim 1 wherein, the temperature of the gas brought into contact with the catalyst is less than 130° C., and the actual space-time yield is less than 2000 h⁻¹.

14. Process according to claim 13 wherein, the temperature of the gas is between 80° and 120° C., and the actual space-time yield is between 500 and 1800 h⁻¹.

15. Process for the preparation of nitrogen from air containing carbon monoxide and/or hydrogen impurities, said process comprising:
   a) contacting the air with oxygen and a catalyst comprising particles selected from the group consisting of gold, palladium, and mixtures thereof, said particles being supported by titanium dioxide, wherein the carbon monoxide and/or hydrogen impurities react with oxygen to form carbon dioxide and/or water respectively;

b) optionally withdrawing the carbon dioxide and the water from the air;

c) separating nitrogen from oxygen in the air; and d) recovering a high-purity nitrogen, substantially free from the carbon monoxide and hydrogen impurities.

16. Process according to claim 15, wherein the nitrogen is separated from the oxygen in the air by cryogenic distillation.

* * * * *